US009477382B2

(12) United States Patent
Hicks et al.

(10) Patent No.: US 9,477,382 B2
(45) Date of Patent: Oct. 25, 2016

(54) MULTI-PAGE CONTENT SELECTION TECHNIQUE

(71) Applicant: BARNES & NOBLE COLLEGE BOOKSELLERS INC., Basking Ridge, NJ (US)

(72) Inventors: Kourtny M. Hicks, Sunnyvale, CA (US); Dale J. Brewer, San Marcos, CA (US)

(73) Assignee: Barnes & Noble College Booksellers, Inc., Basking Ridge, NJ (US)

( * ) Notice: Subject to any disclaimer, the term of this patent is extended or adjusted under 35 U.S.C. 154(b) by 312 days.

(21) Appl. No.: 13/715,238

(22) Filed: Dec. 14, 2012

(65) Prior Publication Data
US 2014/0173482 A1 Jun. 19, 2014

(51) Int. Cl.
*G06F 3/0483* (2013.01)
*G06F 3/0485* (2013.01)
*G06F 3/0488* (2013.01)

(52) U.S. Cl.
CPC ......... *G06F 3/0483* (2013.01); *G06F 3/0485* (2013.01); *G06F 3/04883* (2013.01)

(58) Field of Classification Search
CPC .. G06F 3/0486; G06F 3/0481; G06F 9/4443; G06F 17/24; G06F 9/543; G06F 3/0482; G06F 3/04842; G06F 3/0488; G06F 3/04847; G06F 3/0485; G06F 3/04886; G06F 17/212; G06F 3/017; G06F 3/04845; G06F 3/04855
USPC .......................... 345/173, 156; 382/181, 282
See application file for complete search history.

(56) References Cited

U.S. PATENT DOCUMENTS

| 4,896,543 A | 1/1990 | Gullman |
| 5,633,471 A | 5/1997 | Fukushima |
| 5,844,557 A | 12/1998 | Shively, II |

(Continued)

FOREIGN PATENT DOCUMENTS

| EP | 0722150 A1 | 7/1996 |
| EP | 2437153 | * 4/2012 |

OTHER PUBLICATIONS

"Adonit Jot Touch (for iPad)," Adonit Jot Touch (for iPad) Review & Rating—PCMag.com; http://www.pcmag.com/article2/0,2817,2411192,00.asp; 6pages, printed from the Internet on Jun. 20, 2013.

(Continued)

*Primary Examiner* — Jeffrey A Gaffin
*Assistant Examiner* — Mandrita Brahmachari
(74) *Attorney, Agent, or Firm* — Finch & Maloney PLLC

(57) ABSTRACT

A multi-page content selection mode is provided for devices and systems having display capability. The content may be any type (e.g., text, images, files, etc). In some cases, the user can engage the mode with a combination of gestures and touch points on a touch screen. The combination may include, for example, one or more initial touch points at a desired starting location of target content, followed by a dragging gesture moving from that location to a desired end location of that content. Content between the starting and end locations is selected. Input devices other than touch screens can be used to engage the selection process. During a multi-page selection process, content of a second page can be previewed in a preview area on a first displayed page. In some such cases, content from the second page scrolls into the preview area and displaces content from the first displayed page.

16 Claims, 8 Drawing Sheets

(56) References Cited

U.S. PATENT DOCUMENTS

| | | | |
|---|---|---|---|
| 6,259,438 B1 | 7/2001 | Fleck et al. | |
| 6,956,564 B1 | 10/2005 | Williams | |
| 7,320,105 B1* | 1/2008 | Sinyak | G06F 3/0485 715/204 |
| 7,509,585 B1* | 3/2009 | Gauthier et al. | 715/762 |
| 7,649,524 B2 | 1/2010 | Haim et al. | |
| 7,840,912 B2 | 11/2010 | Elias et al. | |
| 7,898,541 B2 | 3/2011 | Hong et al. | |
| RE42,738 E | 9/2011 | Williams | |
| 8,059,101 B2 | 11/2011 | Westerman et al. | |
| 8,239,413 B2 | 8/2012 | Hubert | |
| 8,274,536 B2 | 9/2012 | Chaudhri et al. | |
| 8,286,104 B1 | 10/2012 | Yonge-Mallo | |
| D670,713 S | 11/2012 | Cranfill et al. | |
| RE44,103 E | 3/2013 | Williams | |
| 8,400,417 B2 | 3/2013 | Ording et al. | |
| 8,508,494 B2 | 8/2013 | Moore | |
| 8,952,912 B1* | 2/2015 | Hock | 345/173 |
| 2001/0025289 A1 | 9/2001 | Jenkins et al. | |
| 2002/0116421 A1 | 8/2002 | Fox et al. | |
| 2004/0148274 A1* | 7/2004 | Warnock | G06Q 30/06 |
| 2005/0073711 A1* | 4/2005 | Dokuni | 358/1.14 |
| 2006/0200764 A1* | 9/2006 | Sellers et al. | 715/526 |
| 2006/0265669 A1* | 11/2006 | Lee | 715/818 |
| 2007/0047002 A1 | 3/2007 | Hull et al. | |
| 2007/0262950 A1* | 11/2007 | Lai et al. | 345/156 |
| 2008/0036747 A1 | 2/2008 | Hope | |
| 2008/0101773 A1* | 5/2008 | Park et al. | 386/124 |
| 2009/0089669 A1* | 4/2009 | Knowles | 715/273 |
| 2009/0237367 A1* | 9/2009 | Ryu et al. | 345/173 |
| 2010/0100854 A1 | 4/2010 | Russell et al. | |
| 2010/0174732 A1* | 7/2010 | Levy | G06F 17/211 707/768 |
| 2010/0192086 A1 | 7/2010 | Kocienda et al. | |
| 2010/0229130 A1 | 9/2010 | Edge et al. | |
| 2010/0259482 A1 | 10/2010 | Ball | |
| 2010/0262659 A1 | 10/2010 | Christiansen et al. | |
| 2010/0318895 A1 | 12/2010 | Steinberger et al. | |
| 2011/0047498 A1* | 2/2011 | Hendricks | 715/776 |
| 2011/0119620 A1* | 5/2011 | Schon | G06F 3/0416 715/785 |
| 2011/0258542 A1 | 10/2011 | Kenney et al. | |
| 2012/0056821 A1 | 3/2012 | Goh | |
| 2012/0127110 A1 | 5/2012 | Amm et al. | |
| 2012/0139879 A1 | 6/2012 | Kim et al. | |
| 2012/0221938 A1 | 8/2012 | Patterson et al. | |
| 2012/0235901 A1 | 9/2012 | Binder | |
| 2012/0242579 A1 | 9/2012 | Chua | |
| 2012/0242584 A1 | 9/2012 | Tuli | |
| 2012/0249768 A1 | 10/2012 | Binder | |
| 2012/0280947 A1 | 11/2012 | Weaver et al. | |
| 2012/0311438 A1* | 12/2012 | Cranfill et al. | 715/256 |
| 2012/0329529 A1 | 12/2012 | van der Raadt | |
| 2013/0016045 A1 | 1/2013 | Zhao et al. | |
| 2013/0036383 A1 | 2/2013 | Yuan et al. | |
| 2013/0063364 A1 | 3/2013 | Moore | |
| 2013/0076632 A1 | 3/2013 | Sirpal et al. | |
| 2013/0076637 A1 | 3/2013 | Teltz | |
| 2013/0076638 A1 | 3/2013 | Sirpal et al. | |
| 2013/0076781 A1 | 3/2013 | Sirpal et al. | |
| 2013/0113699 A1 | 5/2013 | Lim | |
| 2013/0120271 A1 | 5/2013 | Lee et al. | |
| 2013/0135234 A1 | 5/2013 | Hisano et al. | |
| 2013/0139078 A1 | 5/2013 | Chuang et al. | |
| 2013/0139107 A1 | 5/2013 | Jung | |
| 2013/0162532 A1 | 6/2013 | Cheng et al. | |
| 2013/0185680 A1 | 7/2013 | Chaudhri et al. | |
| 2013/0194308 A1 | 8/2013 | Privault et al. | |

OTHER PUBLICATIONS

Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the Internet on Jun. 20, 2013.
"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, originally published Feb. 28, 2013, 13 pages, printed from the Internet on Aug. 13, 2013.
"Bamboo Stylus," Wacom Americas, http://www.wacom.com/en/products/stylus, 5 pages, printed from the Internet on Jun. 20, 2013.
Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, 1 page, printed from the Internet on Aug. 2, 2013.
Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9, 10 pages, Sep. 10, 2004.
"Pen," DuoSense Pen, N-trig Hands-on computing, http://www.n-trig.com/Content.aspx?Page=DigitalPencil, 3 pages, printed from the Internet on Jun. 20, 2013.
"Easing functions," Easing Functions Cheat Sheet, http://easings.net/, 3 pages, printed from the Internet on Jun. 17, 2013.
Kirupa, Easing Functions (aka Timing Functions) in CSS3, printed Apr. 3, 2013, Kirupa.com, http://www.kirupa.com/html5/easing_functions_css3.htm, 16 pages, printed from the Internet on Jun. 18, 2013.
"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html, 5 pages, printed from the Internet on Aug. 2, 2013.
"Simultaneous Pen & Touch: The Natural Way to Work," Perceptive Pixel Active Stylus, www.perceptivepixel.com/_literature_136086/Active_Stylus, 2 pages, printed from the Internet on Dec. 14, 2012.
"Future Apple Notebooks & Tablets may use Acoustic Commands—Patently Apple," originally published Feb. 18, 2011, http://www.patentlyapple.com/patently-apple/2011/02/future-apple-notebooks-tablets-may,6 pages, printed from the Internet on Nov. 3, 2012.
"Guidelines for selecting text and images (Windows Store apps)," http://msdn.microsoft.com/en-us/library/windows/apps/hh465334, 5 pages, printed from the Internet on Jun. 20, 2013.
Lutz, Zachary, "Hands-on with wireless, ultrasonic stylus an touchless gestures at MWC (video)," posted Mar. 1, 2012 at 8:28 AM, http://www.engadget.com/2012/03/01/hands-on-with-wireless-ultrasonic-stylus-and-touchl, 3 pages, printed from the Internet on Jun. 20, 2013.
"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.
"How do WACOM tablets work?," tablet4u.co.uk, http://www.tablet4u.co.uk/techinfo.html, 2 pages, printed from the Internet on Jun. 20, 2013.
Kim, Arnold, "Multi-Touch Page Flipping eBook Concept Shown on an iPad," posted Jan. 22, 2012 at 10:52pm PST, MacRumors—news and rumors you care about, http://www.macrumors.com/2012/01/23/multi-touch-page-flipping-ebook-concept-shown-6 pages, printed from the Internet on Nov. 3, 2012.
"Desktop Touchscreens,"—Desktop touchscreens explained, http://www.touchscreenmagazine.nl/touchscreen-solutions/desktop-touchscreens, 1 page, printed from the Internet on Nov. 3, 2012.
"MTStylus Wireless Stereo Stylus for iPhone/Andriod Phone & Tablet," dexim-MTStylus Wireless Stereo Stylus, http://www.dexim.net/content.php?id=165&pid=11, 2 pages, printed from the Internet on Jun. 20, 2013.
"Padblue 2," BRANDO—mobile.brando.com, http://mobile.brando.com/Padblue-2_p9162c1577d94.html., 4 pages, printed from the Internet on May 10, 2013.
Fingas, Jon, "Panasonic mobile devices to use Anoto's pattern-based pen input technology," posted Jan. 8, 2013 at 1:00PM, http://www.engadget.com/2013/01/08/panasonic-mobile-devices-

(56) References Cited

OTHER PUBLICATIONS to-use-anoto-pattern-pen-, 4 pages, printed from the Internet on Jun. 20, 2013.
"Bluetooth 4.0 SmartPen The future just got a little brighter," Pogo Connect, http://tenonedesign.com/connect.php, 7 pages, printed from the Internet on Jun. 20, 2013.
Quick, Darren, "Pressure sensitive technology set to bring 3D capability to touchscreens," posted on Jan. 31, 2010, Mobile Technology, http://www.gizmag.cominew-touchscreen-technology, 4 pages, printed from the Internet on Aug. 2, 2013.
Rigg, Jamie, "Sony tries to patent stylus with friction-based haptic feedback," posted on Nov. 22, 2012 at 9:50 AM, http://www.engadget.com/2012/11/22/sony-haptic-feedback-stylus-patent/, 2 pages, printed from the Internet on Jun. 20, 2013.
"Stylus Hanging Bluetooth Headset," BRANDO—mobile.brando.com, http://mobile.brando.com/prod_detail.php?prod_id=03291, 4 pages, printed from the Internet on May 10, 2013.
"The JukeStyle is a great budget stylus for your iOS devices," stylus Archives—iPad News, http://www.ipadnews.nl/tag/stylus/, 44 pages, printed from the Internet on Jun. 20, 2013.
Lavrinc, Damon, "Why Flipping Through Paper-Like Pages Endures in the Digital World," originally posted on May 11, 2012 at 3:48PM, Gadget Lab, http://www.wired.com/gadgetlab/2012/05/why-flipping-through-paper-like-pages-endures-in-the-digital-world/, 5 pages, printed from the Internet on May 6, 2013.

Bragdon, et al., "Experimental Analysis of Touch-Screen Gesture Designs in Mobile Environments", Proceedings of the SIGCHI Conference on Human Factors in Computing Systems, pp. 403-412 (2011).
"Gesture Search for Google Mobile", Google Mobile, www.google.com/mobile/gesture-search, 1 page, printed from the Internet on Dec. 26, 2012.
"Comics by comiXology," Comic Book Reader Guide, http://www.comicbookreaderguide.com/comics-by-comixology/, 24 pages, printed from the Internet on May 6, 2013.
"NFC Forum: Frequently Asked Questions," http://www.nfc-forum.org/resources/faqs#acknowledge, 11 pages, printed from the Internet on Feb. 18, 2013.
"How to Remote Wipe an iPhone or iPad," OSXDaily, http://osxdaily.com/2012/06/05/remote-wipe-iphone-or-ipad/, 4 pages, printed from the Internet on Feb. 2, 2013.
"Screen hotspot," Wikipedia, the free encyclopedia, http://en.wikipedia.org/wiki/Screen_hotspot, 1 page, printed from the Internet on May 15, 2013.
"PAiA-Touch Switches," PAiA Corporation USA, file:///S:/Client%20Files/Barnes%20&%20Noble/IDS%20Master%20Folder/S&G%20-%2 . . . , 3 pages, printed from the Internet on Aug. 27, 2013.
Kanai, et al., "Intra-Rendition Navigation," Copyright 2012-2013 International Digital Publishing Forum (IDPF), 13 pages.
"explaining how the sPen tech works (and is very diff than other styluses)," http://forum.xda-developers.com/showthread.php?t=, 1 page, printed from the Internet on Jan. 15, 2013.

\* cited by examiner

MULTI-PAGE CONTENT SELECTION TECHNIQUE

FIELD OF THE DISCLOSURE

This disclosure relates to electronic display devices, and more particularly, to user interface (UI) techniques for interacting with touch screen devices and other computing devices having a display.

BACKGROUND

Electronic display devices such as tablets, eReaders, mobile phones, smart phones, personal digital assistants (PDAs), and other such touch screen electronic display devices are commonly used for displaying consumable content. The content may be, for example, an eBook, an online article or blog, images, a movie or video, a map, just to name a few types. Such display devices are also useful for displaying a user interface that allows a user to interact with an application running on the device. The user interface may include, for example, one or more touch screen controls and/or one or more displayed labels that correspond to nearby hardware buttons. The touch screen display may be backlit or not, and may be implemented for instance with an LED screen or an electrophoretic display. Such devices may also include other touch sensitive surfaces, such as a track pad (e.g., capacitive or resistive touch sensor) or touch sensitive housing (e.g., acoustic sensor).

DETAILED DESCRIPTION

Figure 1A:
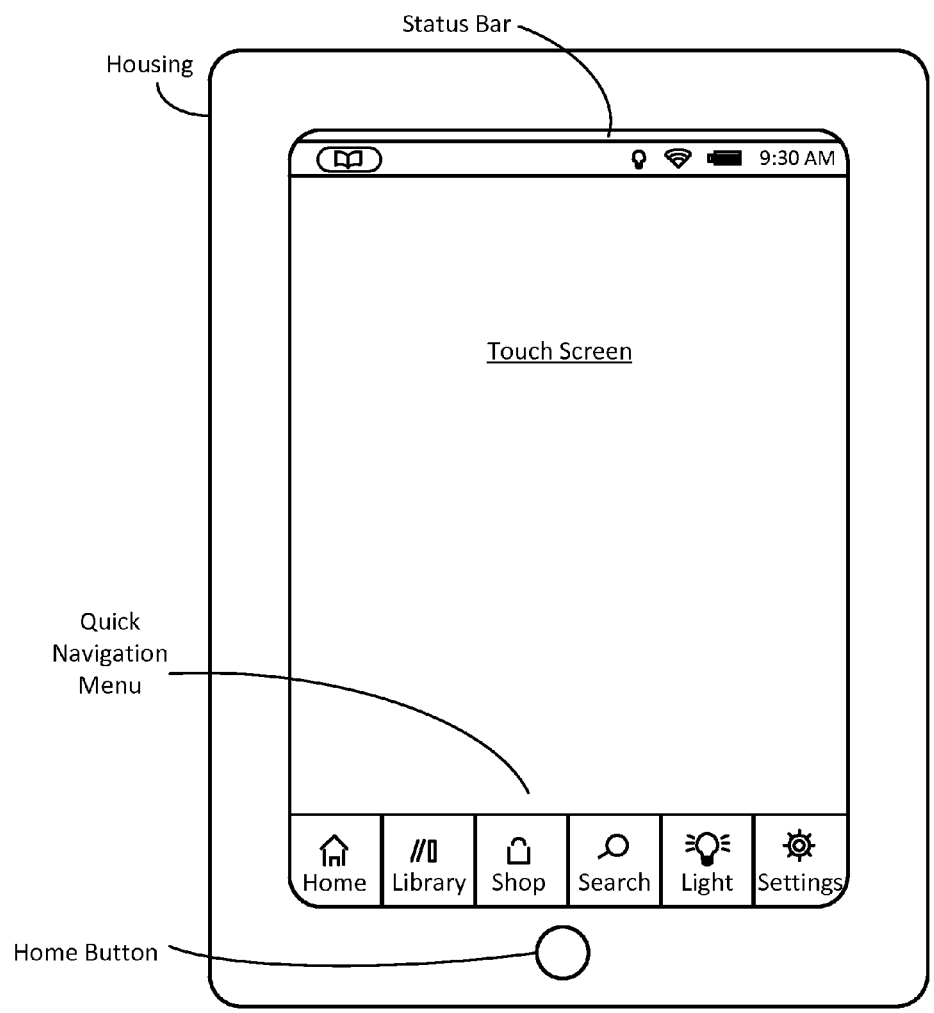
FIGS. 1a-b illustrate an example electronic touch screen device having a content selection mode configured in accordance with an embodiment of the present invention.

Techniques are disclosed for providing a content selection mode in electronic touch screen devices, and other devices/systems having a display. The content may be, for instance, text, graphics, images, files, and/or other consumable content. The user can engage the mode, for example, with a combination of gestures and touch points on a touch screen. The combination may include, for example, one or more initial touch points at a desired starting location of the target content, followed by a dragging gesture with one or more touch points moving from the starting location to the desired end location of the target content, wherein content between the starting and end locations is selected. Input devices other than touch screen can also be used (e.g., mouse, trackpad, etc) to engage and control the selection process as described herein, as will be appreciated in light of this disclosure. The content selected may span multiple pages and the selection mode may display content from subsequent pages in a preview area on at least a portion of the screen. The selection may include non-contiguous content blocks, if so desired.

General Overview

As previously explained, electronic display devices such as tablets, eReaders, and smart phones are commonly used for displaying user interfaces and consumable content. The user of such devices can typically consume the displayed content with relative ease. In some instances, the user may wish to select a portion of the given content for the purpose of copying that portion to a so-called clip board so that it can subsequently be pasted into another document. While available content selection techniques are commonly provided with touch screen devices for such purposes, such techniques require the user to drag a handle or other such user interface feature from the start location to the desired end location. Moreover, such drag-based techniques seemingly do not allow for the selection to continue across a page break. In this sense, the user is required to carry out multiple selection actions, depending on the number of pages or sections over which the target content spans.

Thus, and in accordance with an embodiment of the present invention, multi-page content selection techniques are disclosed for use in electronic touch screen devices, as well as other computing systems with a display. The content may include, for example, text, graphics, images, folders/files, embedded audio and/or video files, and/or any other consumable content. In some embodiments, the user can engage the mode with a combination of gestures and multiple touch points on the touch screen that identifies the content selection mode is desired. The combination may include, for example, an initial touch point at a desired starting location of the target content, followed by a dragging gesture with one or more touch points from the starting location to the desired end location of the target content. The content between the starting and end locations is selected so as to allow the user to operate on that selected content. The selected content may include content spanning multiple pages, columns, or sections.

In one specific example embodiment, if the initial touch includes two (or more) touch points, then the selection may commence immediately without delay. In one such example case, the initial target piece of content at the start location is automatically and immediately selected, and any subsequent dragging of the two (or more) touch points causes the selection to advance (or retreat, as the case may be) in real-time and in unison with the drag point movement to select (or de-select, as the case may be) a contiguous block of content. The initial target piece of content may be, for example, a word, graphic, image, file, folder, or other individually selectable (touchable) piece of displayed digital content. A selection indicator can be used to visually inform the user that the initial touch point of a content selection action is in place, which may be helpful to the user. In other example embodiments, the targeted content may highlighted all at once after release of the dragging gesture touch points from the piece of target content at the end location.

In another example embodiment, if the initial touch includes a single touch point, then the selection of the piece of content at that starting point may occur after a brief delay or as soon as additional touch points are added. The delay, which may be hard-coded or user-configurable or otherwise pre-established (e.g., 2 to 4 seconds), can be used to distinguish the initial touch point from other gestures (e.g., tap gesture) that might be associated with some other function. In other embodiments, no delay may be necessary so long as the single touch point can be recognized as an indicator that the user wishes to engage the content selection mode (based on, for example, hard-coding, user-configuration, and/or the application in which the single touch point is provided). In any such single initial touch point cases, the user can continue with the content selection process (either after the delay or immediately, depending on the configuration as just explained) by moving the touch point along the content in the desired direction of selection. The user may add additional drag points, for instance, to further uniquely identify the selection mode, in some embodiments. The dragging gesture may cause selection to advance (or retreat, as the case may be) in real-time and in unison with the drag point movement to select (or de-select, as the case may be) a contiguous block of content. Alternatively, the targeted content may be highlighted all at once after release of the dragging gesture touch points. As used here, highlighting may refer, for example, to any indication of a content selection, which may or may not include a formatting change.

The selected content may traverse section breaks or column breaks within a given page, depending on the progression of the drag point, and may traverse any number of content section breaks as needed, depending on the progression of the drag point. In one such example embodiment, an intervening navigational gesture may be presumed when the drag point reaches a section break thereby causing navigation to the next logical section of content so that the selection process may continue in a seamless and uninterrupted fashion. In some such cases, the user interface may be programmed or otherwise configured, for example, to temporarily re-categorize or otherwise treat a dragging gesture that reaches a content boundary area (such as the bottom of a page, or the bottom of the display screen) as a preview prompt gesture. As the dragging gesture rests on the boundary area, another section of content is displayed and selected after a brief delay (e.g., 2 to 4 seconds). When the user moves the touch point(s) off of the boundary area and back into a currently displayed section, dragging gesture functionality resumes and the user can then adjust the drag-based content selection within that page as described herein. As will be further appreciated in light of this disclosure, the user may select multiple non-contiguous sections of content if so desired (e.g., select a first section using a first set of initial and dragging contact points, then a second section using a second set of initial and dragging contact points, etc). In such cases, the selected sections can stay selected until the user affirmatively exits the content selection mode.

Note that the second piece of content at the end location is different than the first piece of content at the start location. Further note that the second piece of content may be logically located either above or below the first piece of content (or to the left or right of the first piece of content), within the overall given structure of the content. The selection is respectful of the content structure and natural flow of the consumption path, and only content between (and including) the start and end locations is selected, in accordance with some embodiments. In some cases, the selected content can be indicated with a color change associated with the selected block, and/or with brackets or handles or virtual bookends or dashed outlining, or with other visual indicators that effectively highlight or otherwise accentuate the block of selected content. The user may configure such features, in some embodiments. In other embodiments, such features may be provisioned by default or hard-coded. Any number of such techniques can be used to provide the user with a visual indicator of the selected content, as will be appreciated in light of this disclosure.

Once selected, the user can then operate on the selection, in accordance with some embodiments. For example, the user can execute a copy-and-paste operation (e.g., via control-c and control-p keystrokes, or via 'copy' and 'paste' button presses) so that the selected portion of content is copied to the device clip board so that it can subsequently be pasted into another location/document. Likewise, the user can execute a cut-and-move operation (e.g., via control-x and control-p keystrokes, or via 'cut' and 'paste' button presses) so that the selected portion of content is removed to the device clip board so that it can subsequently be pasted into another location/document. In some such embodiments, copy, cut, and paste UI press-button features can be displayed to the user via the touch screen to facilitate such copying, cutting, and pasting by the user. In another example embodiment, the user can apply a formatting change to the selected portion, such as a change in font or pitch or color with respect to selected text, or a change from color to black-and-white or grayscale with respect to selected images, etc. In another example embodiment, the user can apply a security change to the selected portion, such as a change in access permissions with respect to selected files or folders, etc. In another example embodiment, the user can perform a dictionary look-up or search based on the selected content. In a more general sense, once the content is selected, any number of post-selection actions can then be applied to that selection content. In still other example embodiments, the user may wish to simply highlight the selected portion of content to make it easier to see or find within the document. In any such cases, any number of suitable UI control features (e.g., copy/cut/paste/format UI press-buttons) can be provided to the user, depending on the given context and application in which the user is operating, as well as capabilities of the device. In some embodiments, an 'exit' UI press-button feature can also be displayed (or the equivalent thereof), which the user can tap or otherwise engage to end the content selection operation. Such example UI control features can be displayed automatically to user once the content is selected, in accordance with some embodiments.

Given the global nature and/or uniqueness of the engagement mechanism, in accordance with an embodiment of the present invention, the content selection mode can be similarly invoked within multiple diverse applications (e.g., eBook, browser, picture viewer, file manager, etc) and without conflicting with other global gestures that might also be used by the device's operating system. While some example embodiments include an initial touch of one or two points followed by a dragging gesture, other embodiments may include a different scheme (e.g., single point touch to start followed by a multi-point dragging gesture, or a three point touch to start followed by a three point dragging gesture, etc). In a more general sense, any uniquely identifiable combination of touch points and dragging gestures can be used to engage a seamless and page-spanning content selection mode, in accordance with an embodiment of the present invention. The uniqueness of the touch point/drag scheme may be based, for example, on the number of touch points simultaneously provided and/or the nature of the touch (e.g., a quick initial tap followed by a drag, a pressand-hold for a predetermined duration followed by a drag, a sequence of taps followed by a drag, an initial swipe followed by a drag, an initial circular and/or elliptical gestures followed by a drag, etc). As will be further appreciated, the uniqueness of the touch point/drag scheme may exist, for example, at the global level or the application level.

The techniques allow for content selection spanning multiple pages or sections in a relatively fast, efficient, and intuitive manner, so that the user can seamlessly and selectively engage and/or disengage the content selection mode without disrupting the consumption experience, in accordance with some embodiments. In some such cases, the user can move the dragging gesture in either direction to advance or retreat the selected section, without having to be on a specific drag zone. The example embodiments described herein illustrate selecting subsequent sections of content, but the techniques disclosed could equally apply to selecting content on previous pages or sections, as will be appreciated in light of this disclosure. The touch point and dragging gestures may be provided by the user's fingers or any suitable implement, such as a stylus.

Architecture and Applications

Figure 1B:
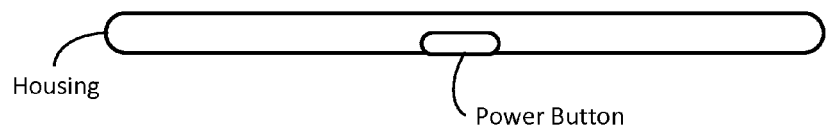

FIGS. 1a-b illustrate an example electronic touch screen device having a multi-page content selection mode configured in accordance with an embodiment of the present invention. The device could be, for example, a tablet such as the NOOK® by Barnes & Noble. In a more general sense, the device may be any electronic device having a touch screen user interface and capability for displaying content to a user, such as a mobile phone or mobile computing device such as an eReader or laptop, a desktop computing system, a television, a smart display screen, or any other device having a touch screen display. Other such example embodiments may not include a touch screen, but may use other input devices such as a mouse or trackpad, for instance, in conjunction with a regular LED or CRT display. Other embodiments may include a combination of such input mechanisms (e.g., touch screen and trackpad). As will be appreciated, the claimed invention is not intended to be limited to any particular kind or type of electronic device.

As can be seen with this example configuration, the device comprises a housing that includes a number of hardware features such as a power button and a press-button (sometimes called a home button herein). A touch screen based user interface is also provided, which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such UI touch screen controls and features, or different UI touch screen controls and features altogether, depending on the target application of the device. Any such general UI controls and features can be implemented using any suitable conventional or custom technology, as will be appreciated.

The power button can be used to turn the device on and off, and may be used in conjunction with a touch-based UI control feature that allows the user to confirm a given power transition action request (e.g., such as a slide bar or tap point graphic to turn power off). In this example configuration, the home button is a physical press-button that can be used as follows: when the device is awake and in use, tapping the button will display the quick navigation menu, which is a toolbar that provides quick access to various features of the device. The home button may also be configured to cease an active function that is currently executing on the device, such as a content selection mode as described herein. The button may further control other functionality if, for example, the user presses and holds the home button. For instance, an example such push-and-hold function could engage a power conservation routine where the device is put to sleep or an otherwise lower power consumption mode. So, a user could grab the device by the button, press and keep holding as the device was stowed into a bag or purse. One physical gesture that would safely put the device to sleep. Thus, in such an example embodiment, the home button may be associated with and control different and unrelated actions: 1) show the quick navigation menu; 2) exit the multi-page content selection mode, but keep the page being read or otherwise consumed displayed (e.g., so that another mode can be entered, if so desired); and 3) put the device to sleep. Numerous other example configurations and variations will be apparent in light of this disclosure, and the claimed invention is not intended to be limited to any particular set of hardware buttons or features, or device form factors.

As can be further seen, the status bar may also include a book icon (upper left corner). In some such cases, the user can access a sub-menu that provides access to a content selection mode configuration sub-menu by tapping the book icon of the status bar. For example, upon receiving an indication that the user has touched the book icon, the device can then display the content selection mode configuration sub-menu shown in FIG. 1d. In other cases, tapping the book icon just provides bibliographic information on the content being consumed. Another example way for the user to access a content selection mode configuration sub-menu such as the one shown in FIG. 1d is to tap or otherwise touch the Settings option in the quick navigation menu, which causes the device to display the general sub-menu shown in FIG. 1c. From this general sub-menu the user can select any one of a number of options, including one designated Screen/UI in this specific example case. Selecting this sub-menu item (with an appropriately placed screen tap) may cause the content selection mode configuration sub-menu of FIG. 1d to be displayed, in accordance with an embodiment. In other example embodiments, selecting the Screen/UI option may present the user with a number of additional sub-options, one of which may include a content selection mode option, which may then be selected by the user so as to cause the content selection mode configuration sub-menu of FIG. 1d to be displayed. Any number of such menu schemes and nested hierarchies can be used, as will be appreciated in light of this disclosure.

As will be appreciated, the various UI control features and sub-menus displayed to the user are implemented as UI touch screen controls in this example embodiment. Such UI touch screen controls can be programmed or otherwise configured using any number of conventional or custom technologies. In general, the touch screen translates the user touch in a given location into an electrical signal which is then received and processed by the underlying operating system (OS) and circuitry (processor, etc). Additional example details of the underlying OS and circuitry in accordance with some embodiments will be discussed in turn with reference to FIG. 2a.

Figure 1C:
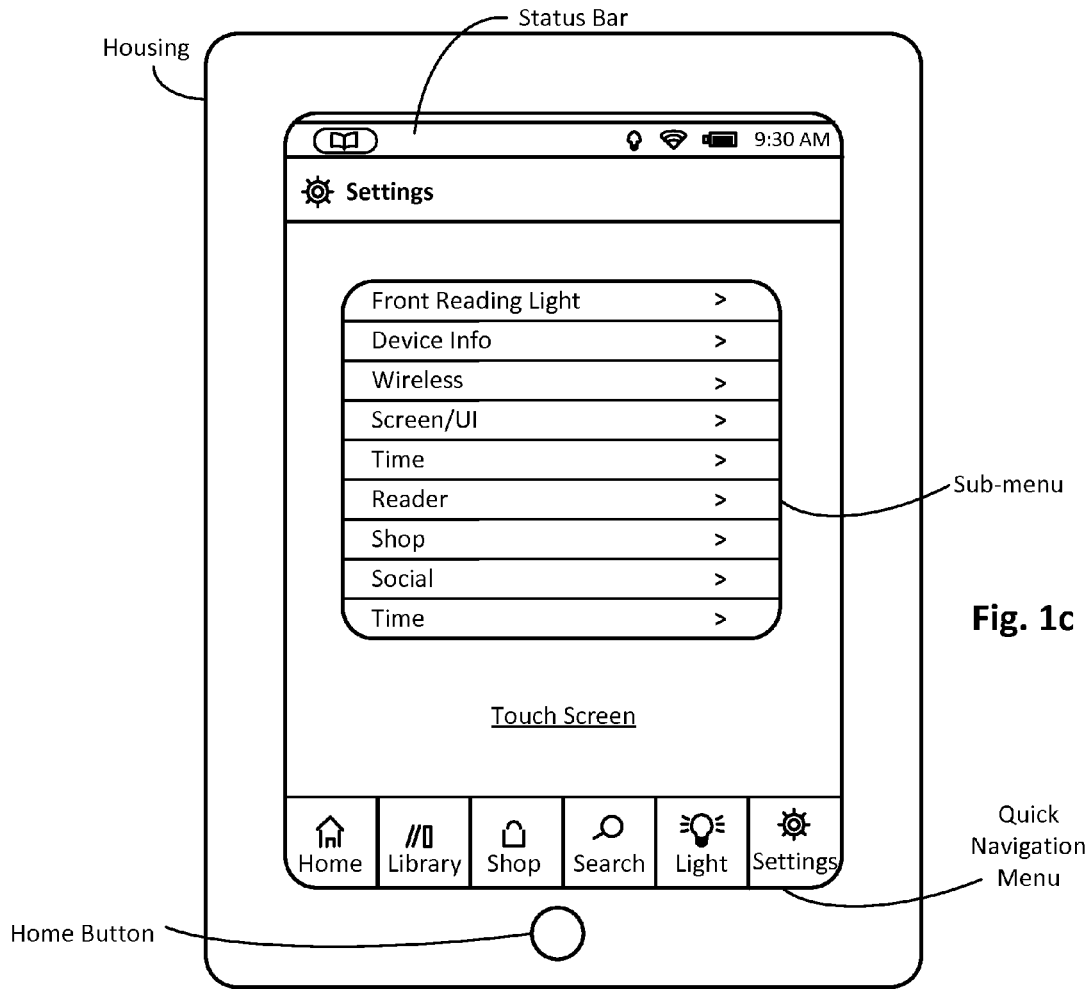
FIGS. 1c-d illustrate example configuration screen shots of the user interface of the electronic touch screen device shown in FIGS. 1a-b, configured in accordance with an embodiment of the present invention.
Figure 1D:
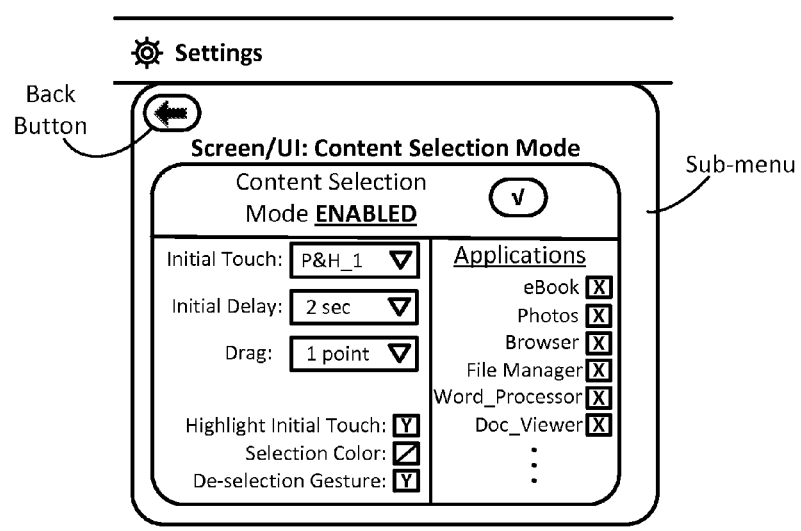

As previously explained, and with further reference to FIGS. 1c and 1d, once the Settings sub-menu is displayed (FIG. 1c), the user can then select the Screen/UI option. In response to such a selection, the content selection mode configuration sub-menu shown in FIG. 1d can be provided to the user. In this example case, the content selection mode configuration sub-menu includes a UI check box that when checked or otherwise selected by the user, effectively enables the content selection mode (shown in the enabled state); unchecking the box disables the mode. Other embodiments may have the content selection mode always enabled, or enabled by a physical switch or button, for example. The user can configure a number of features with respect to the content selection mode, in some cases. Other embodiments are not configurable.

In this example embodiment, once the content selection mode is enabled, the user can choose the type of contact desired for each of the initial and drag touch points that will be used to select the target content. For instance, in the example configuration shown, the initial point is set via a pull-down menu, with the 'Initial Touch' point set to a press-and-hold single touch point (P&H_1) and the 'Drag' touch point set to one point. An example set of initial touch point choices that can be offered by the initial touch point pull-down menu is provided in Table 1. As

TABLE 1

Example Initial Touch Point Choices

| Choice | Type |
| --- | --- |
| P&H_1 | Single touch point press-and-hold, on target piece of content |
| P&H_2 | Double touch point press-and-hold, on target piece of content |
| P&H_3 | Triple touch point press-and-hold, on target piece of content |
| Diagonal_1 | Single touch point diagonal swipe thru target piece of content |
| Diagonal_2 | Double touch point diagonal swipe thru target piece of content |
| Circular_1 | Single touch point circle around/thru target piece of content | will be appreciated, numerous variations will be apparent in light of this disclosure. The provided contact can be on the target piece of content (press-and-hold touch point), or can pass thru the target piece of content (mini-swipe/diagonal or rotating gesture touch point), or some other contact that at least partially touches the target piece of content. In any such cases, the initial touch point gesture transitions to the drag gesture, with or without delay, depending on the number of initial touch points, in accordance with an embodiment. In one example such embodiment, only a single touch point press-and-hold gesture need be associated with a delay (e.g., 3 seconds) so as to distinguish it from other single touch point press-and-hold gestures associated with other functions. This initial delay may be user-configurable as shown in the example of FIG. 1d, and may be grayed out or set to zero when not needed as a qualifier. For instance, a double or triple touch point press-and-hold gesture is more unique and may therefore not need to be further qualified or otherwise distinguished. With further reference to Table 1, a diagonal gesture thru the initial target piece of content can also be provided with any number of touches (e.g., 1 finger swipe, 2 finger swipe, . . . , etc), and then readily transition into the drag gesture. Likewise, a circular gesture can also pass thru the target piece of content and may be provided with any number of touches (e.g., 1 finger, 2 finger, . . . , etc). As will be further appreciated, a multi-touch initial touch point may cause not only the target piece of content to be selected, but may also select neighboring content given the broadness of the touch, in some embodiments. In some such embodiments, multiple touch points can be analyzed to identify a centroid of a given multi-touch cluster, and the piece of content closest to that centroid can be initially selected. In some such embodiments, the user can mini-drag the multi-touch cluster over the target piece of content until that target piece of content is selected, and then transition to the drag gesture to finalize the initial touch point placement and continue with the selecting. Numerous configuration or implementation schemes that allow for a content selection mode that can be globally and/or uniquely activated as needed and without conflicting with other UI touch screen commands/gestures supported by the device will be apparent in light of this disclosure. Another example of user-configurable functionality would be to allow selection of non-contiguous blocks (e.g., via a UI check box or other suitable mechanism), although other embodiments may hard-code such functionality. Further note that styluses or other implements may also be used to provide the initial and dragging touch point as well, and the claimed invention is not intended to be limited to any particular manner of causing the various touch points.

In the example embodiment of FIG. 1d, the user may also enable highlighting of the initial touch point, by selecting yes (Y) with respect to the provisioned 'Highlight Initial Touch' UI feature. In such cases, the target piece of content will be selected/highlighted, for example, after a predetermined delay (e.g., if a single initial touch point), or immediately (e.g., if multiple or otherwise unique initial touch point). In other cases, only a sound effect is given as an indication that the initial touch point has been received. In still other embodiments, both aural and visual cues are provided to make that indication. Note, however, that such cues/indications need not be given in all embodiments. Numerous variations and configurations will be apparent in light of this disclosure.

With further reference to the example embodiment of FIG. 1d, the user may also specify a color scheme with respect to the selected content. For instance, the user can select a transparent background color that will effectively encapsulate the selected content, and an opaque background color that will effectively obfuscate the non-selected content. The selected color scheme can be shown in a UI feature such as a divided square as shown (one half is transparent color/one half is opaque color). Other embodiments may automatically apply a given transparent color to the selected content without doing anything to non-selected content, or outline the selected content with a dashed line or other border, for example. Another embodiment may be configured to gray-out or otherwise soften unselected content. Numerous highlighting schemes can be used, and the claimed invention is not intended to be limited to any particular one.

With further reference to FIG. 1d, the user may also enable a de-selection gesture by selecting yes (Y) with respect to the 'De-selection Gesture' UI feature. In such cases, the selected content will stay selected until the user executes the de-selection gesture. For example, the user may de-select the selected content by pressing the home button, or tapping the touch screen in a specific area or over the selected content. In another example case, the user may de-select the selected content by executing a more complex specific gesture (which may or may not be user-configurable), such as a counter-clockwise circular gesture with two fingers, or a two finger diagonal swipe having a negative slope (from the upper left to lower right). Other embodiments may de-select the selected content after the user carries out a post-selection action. Numerous such suitable de-selection schemes can be used, and the claimed invention is not intended to be limited to any particular one. As will be appreciated, such affirmative de-selection enables selection of non-contiguous sections of content, such that selected sections of content stay selected as other sections are subsequently selected as well.

With further reference to the example embodiment of FIG. 1d, the user may also specify a number of applications in which the content selection mode can be invoked. Such a configuration feature may be helpful, for instance, in a tablet or laptop or other multifunction computing device that can execute different applications (as opposed to a device that is more or less dedicated to a particular application). In this example case, the available applications are provided along with a corresponding check box. Note the diverse nature of the example applications, including an eBook application, a photo viewing application, a browser application, a file manager application, a word processor application, a document viewer application, which are just a few examples. In other embodiments, the content selection mode can be invoked whenever the initial and drag points are provided in the context of displayed content that is selectable, regardless of the application being used. Any number of applications or device functions may benefit from a content selection mode as provided herein, whether user-configurable or not, and the claimed invention is not intended to be limited to any particular application or set of applications.

As can be further seen, a back button arrow UI control feature may be provisioned on the touch screen for any of the menus provided, so that the user can go back to the previous menu, if so desired. Note that configuration settings provided by the user can be saved automatically (e.g., user input is saved as selections are made or otherwise provided). Alternatively, a save button or other such UI feature can be provisioned, which the user can engage as desired. While FIGS. 1c and d show user configurability, other embodiments may not allow for any such configuration, wherein the various features provided are hard-coded or otherwise provisioned by default. The degree of hard-coding versus user-configurability can vary from one embodiment to the next, and the claimed invention is not intended to be limited to any particular configuration scheme.

Figure 2A:
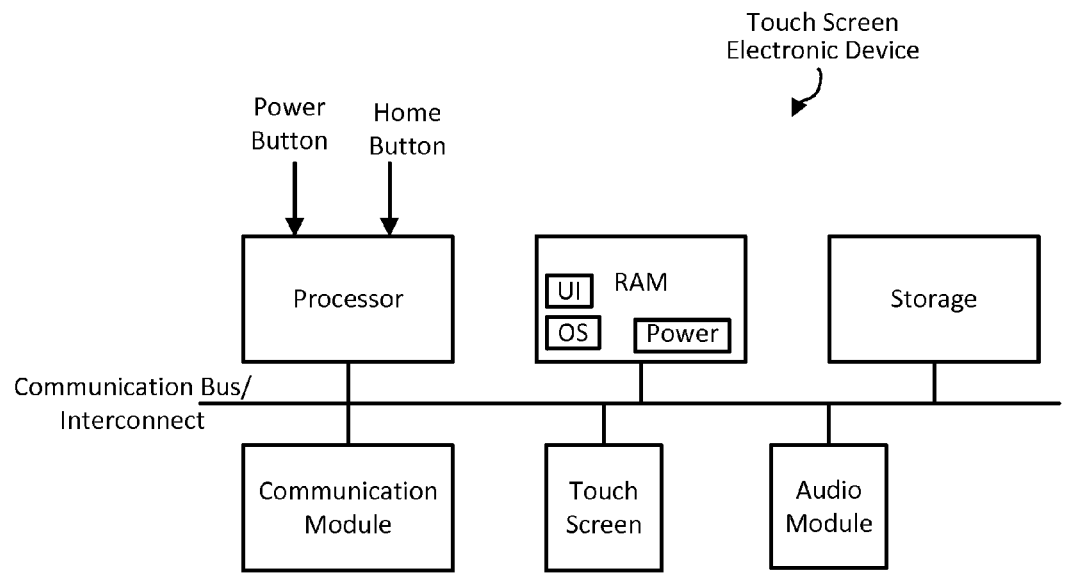
FIG. 2a illustrates a block diagram of an electronic touch screen device configured in accordance with an embodiment of the present invention.

FIG. 2a illustrates a block diagram of an electronic touch screen device configured in accordance with an embodiment of the present invention. As can be seen, this example device includes a processor, random access memory (RAM), additional storage/memory, a communications module, a touch screen, and an audio module. A communications bus and interconnect is also provided to allow inter-device communication. Other typical componentry and functionality not reflected in the block diagram will be apparent (e.g., battery, co-processor, etc). The touch screen and underlying circuitry is capable of translating a user's physical contact with the screen into an electronic signal that can be manipulated or otherwise used to trigger a specific user interface action, such as those provided herein. The principles provided herein equally apply to any such touch sensitive devices. For ease of description, examples are provided with touch screen technology.

In this example embodiment, the RAM includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc), and encoded on a machine readable medium, that when executed by the processor (and/or co-processors), carries out the functionality of the device including a UI having a multi-page content selection mode as variously described herein. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., 800 MHz Texas Instruments OMAP3621 applications processor), and may include one or more co-processors or controllers to assist in device control. In this example case, the processor receives input from the user, including input from or otherwise derived from the power button and the home button. The processor can also have a direct connection to a battery so that it can perform base level tasks even during sleep or low power modes. The RAM can be any suitable type of memory and size (e.g., 256 or 512 Mbytes SDRAM), and in other embodiments may be implemented with non-volatile memory or a combination of non-volatile and volatile memory technologies. The storage can also be implemented with any suitable memory and size (e.g., 2 GBytes of flash memory). The display can be implemented, for example, with a 6-inch E-ink Pearl 800×600 pixel screen with Neonode® zForce® touchscreen, or any other suitable display and touchscreen interface technology. The communications module can be, for instance, any suitable 802.11 b/g/n WLAN chip or chip set, which allows for connection to a local network so that content can be downloaded to the device from a remote location (e.g., content provider, etc, depending on the application of the display device). In some specific example embodiments, the device housing that contains all the various componentry measures about 6.5" high by about 5" wide by about 0.5" thick, and weighs about 6.9 ounces. Any number of suitable form factors can be used, depending on the target application (e.g., laptop, desktop, mobile phone, etc). The device may be smaller, for example, for smartphone and tablet applications and larger for smart computer monitor and laptop applications.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms. The power management (Power) module can be configured as typically done, such as to automatically transition the device to a low power consumption or sleep mode after a period of non-use. A wake-up from that sleep mode can be achieved, for example, by a physical button press and/or a touch screen swipe or other action. The user interface (UI) module can be, for example, based on touchscreen technology and the various example screen shots shown in FIGS. 1a-d and 3a-e, and 4a-d in conjunction with the multi-page content selection mode methodologies demonstrated in FIG. 5, which will be discussed in turn. The audio module can be configured, for example, to speak or otherwise aurally present a selected eBook or other textual content, if preferred by the user. Numerous commercially available text-to-speech modules can be used, such as Verbose text-to-speech software by NCH Software. In such audio-based cases, note that the content selection techniques as described herein can be used to select the textual content to be converted to audio, for instance. In some example cases, if additional space is desired, for example, to store digital books or other content and media, storage can be expanded via a microSD card or other suitable memory expansion technology (e.g., 32 GBytes, or higher).

Client-Server System

Figure 2B:
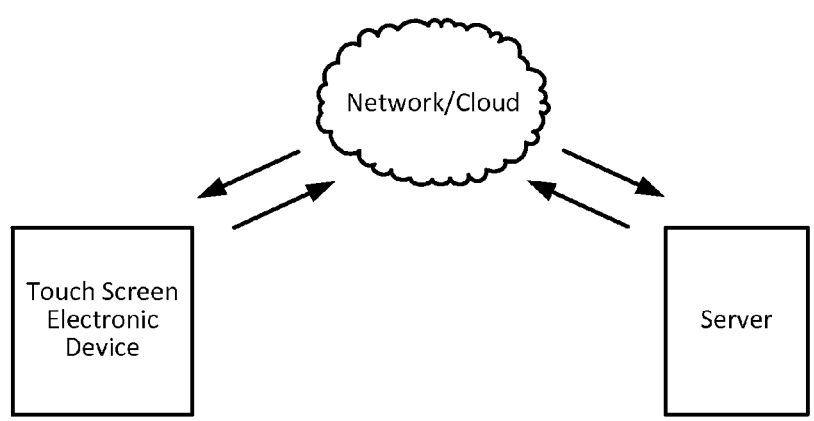
FIG. 2b illustrates a block diagram of a communication system including the electronic touch screen device of FIG. 2b, configured in accordance with an embodiment of the present invention.

FIG. 2b illustrates a block diagram of a communication system configured in accordance with an embodiment of the present invention. As can be seen, the system generally includes an electronic touch screen device (such as the one in FIG. 2a) that is capable of communicating with a server via a network/cloud. In this example embodiment, the electronic touch screen device may be, for example, an eBook reader, a mobile cell phone, a laptop, a tablet, desktop, or any other touch sensitive computing device. The network/cloud may be a public and/or private network, such as a private local area network operatively coupled to a wide area network such as the Internet. In this example embodiment, the server may be programmed or otherwise configured to receive content requests from a user via the touch screen device and to respond to those requests by providing the user with requested or otherwise recommended content. Is some such embodiments, the server is configured to remotely provision a multi-page content selection mode as provided herein to the touch screen device (e.g., via JavaScript or other browser based technology). In other embodiments, portions of the content selection methodology are executed on the server and other portions of the methodology are executed on the device. Numerous server-side/client-side execution schemes can be implemented to facilitate a content selection mode in accordance with an embodiment, as will be apparent in light of this disclosure.

Multi-Page Selection Examples

FIGS. 3a-e collectively illustrate an example multi-page content selection mode that can be applied to a touch sensitive display of an electronic device, in accordance with an embodiment of the present invention. In this example case, the targeted content selection spans across three pages. However, as will be appreciated in light of this disclosure, the targeted content selection may span any number of intervening section breaks, chapters, columns, or pages.

Figure 3A:
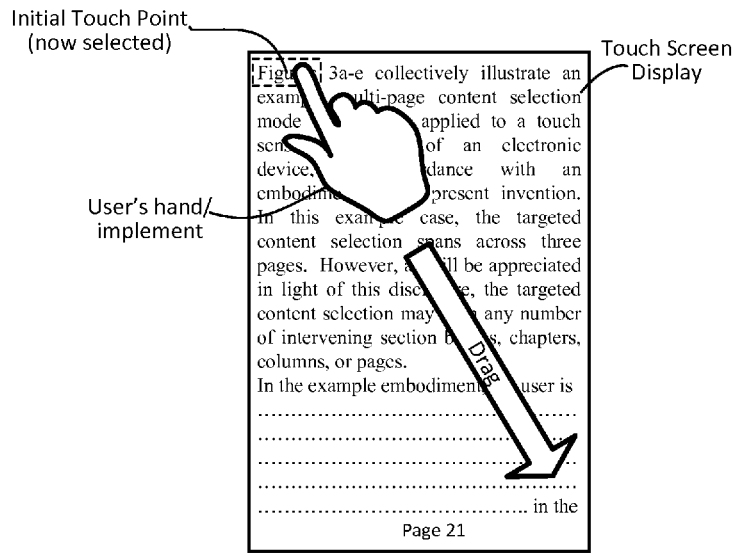
FIGS. 3a-e illustrate an example content selection mode of an electronic touch screen device, in accordance with an embodiment of the present invention.
Figure 3B:
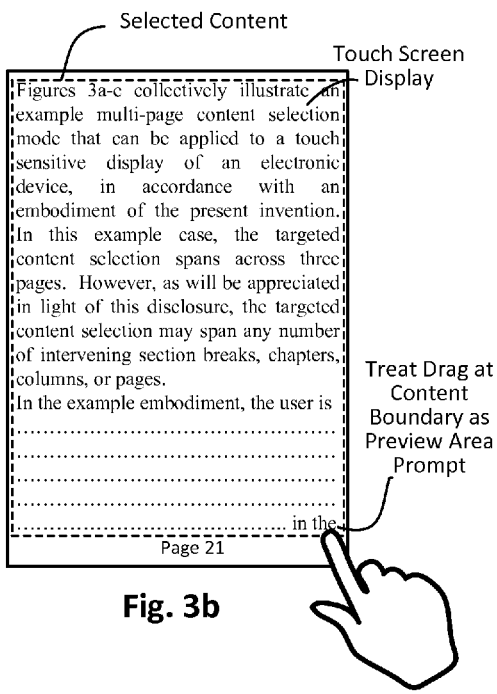

In the example embodiment, the user is reading some text but the same techniques can be applied to any type of content, as previously explained. In FIG. 3a, the user is providing the initial touch point, where the initial target piece of content is the word 'Figures' at the beginning of the first sentence shown on page 21. In one embodiment, the target piece of content may be highlighted or otherwise selected, for example, after a brief delay (e.g., 1 to 4 seconds) from application of the initial touch point. In other embodiments, the initial highlighting/selecting may be immediate, assuming the content selection mode can be immediately recognized in the given context. In FIG. 3b, the user has dragged the touch point and the target piece of content is now highlighted or otherwise selected, as indicated with a dashed border in this example case. In addition, note that the dragging touch point has reached the content boundary area of the displayed content, which is a page break at the bottom right corner of the screen in this particular example.

Figure 3C:
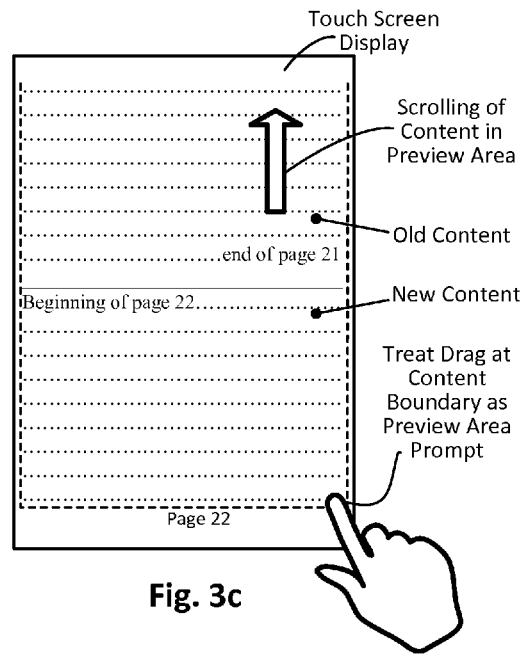

At this point, the content selection mode of this example embodiment is programmed or otherwise configured to convert or otherwise treat the dragging gesture as a preview prompt gesture so as to preview the next page of content so that the content selection process can continue, in accordance with an embodiment of the present invention. In accordance with such an embodiment, the user does not have to actually make a separate navigation gesture; rather, the user can just hold the drag touch point on the content boundary area, so that the next page of content will be previewed to the user. In response, the following page may begin being scrolled upward slowly so that the user has time to evaluate the newly displayed content for the desired end location, or otherwise to move off the boundary area so as to allow the user more time to evaluate the newly displayed content for the desired end location. In the latter case, the user can move back onto the boundary area to continue the scrolling-based preview action, as desired. FIG. 3c shows an example embodiment of the preview function that has begun scrolling the text of page 21 (old content) upward and previewing page 22 (new content). The uppermost content of page 21 is being displaced by the previewed content of page 22, in this example embodiment. In this particular example, the entire document window becomes a preview area through which the text scrolls. FIG. 3c also shows the continued holding of the dragging touch point at the content boundary area, thereby continuing the preview function, so as to advance further through the content. In one particular example, as the subsequent page is scrolled upward, the speed of the scrolling may accelerate. For instance: if an initial scrolling speed of one to two lines per second is maintained for one page, then the scrolling speed may then accelerate to the second scrolling speed (e.g., half-page per two seconds); if the second scrolling speed is maintained for two pages, then the scrolling speed may then accelerate to the third scrolling speed (e.g., one page per second). The user can back off the boundary area to stop or slow the scrolling at any time. Note that the page numbering at the bottom of the touch screen display is marking the page where the end of the selection is located, in this example embodiment.

Figure 3D:
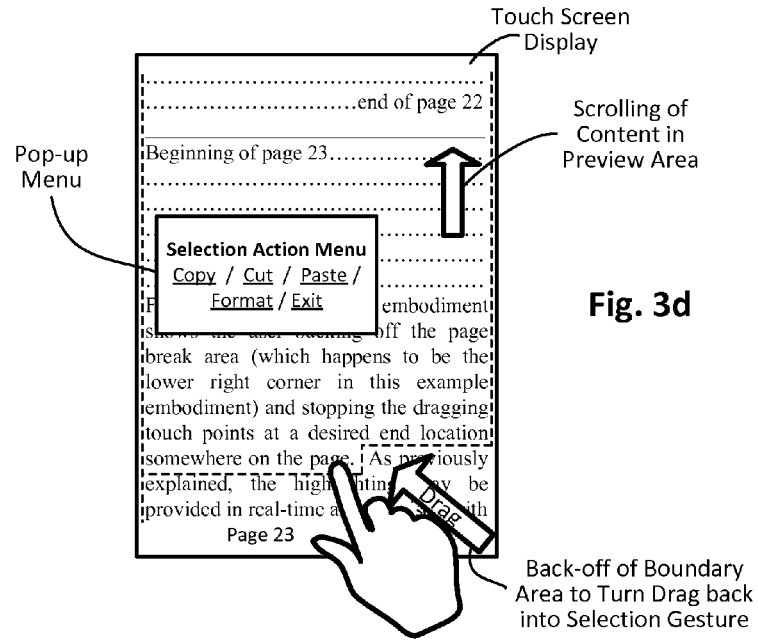

FIG. 3d of this example embodiment shows the user backing off the content boundary area and stopping the dragging touch point at the desired end location, where the target piece of content is the word 'page' near the bottom of the page. The selection and outlining may be provided in real-time and in unison with the dragging touch point, or upon release of the dragging touch point. In this example embodiment, the target selection between (and including) the initial touch point on page 21 and the dragging end location on page 23 is highlighted or otherwise selected, as collectively shown in FIGS. 3a-d as well as in FIG. 3e. As can be further seen in the example scenario of FIGS. 3a-d, the initial and dragging touch point is provided by one of the user's fingers. Of course, the touch point or points can be made with other fingers, styluses, or any other implement or body part that can provide the requisite impact on the touch sensitive screen. Other embodiments may not have real-time outlining (or any other indication of selection activity) that moves in unison with the drag gesture. As previously explained, other highlighting schemes may be used as well.

Figure 3E:
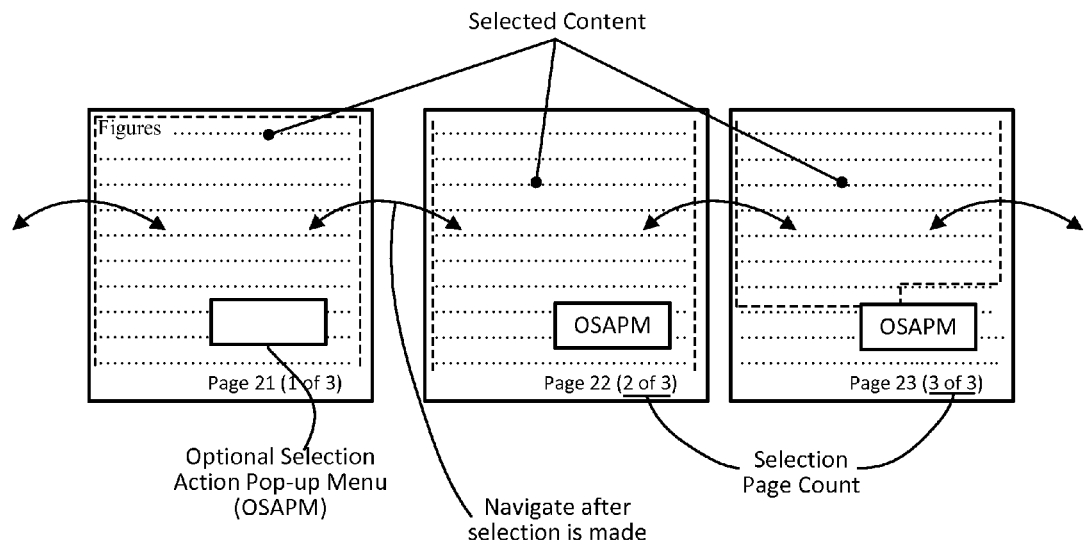

FIG. 3e shows an optional Selection Action Pop-up Menu (OSAPM) that can be provided automatically upon release of the dragging touch point, on each of the three pages involved in the user's selection, in accordance with an embodiment. As can be seen, this optional pop-up menu provides a Selection Action Menu that includes a number of relevant actions that the user might wish to execute or otherwise carry out on the selected content. The actions in this example case include Copy, Cut, Paste, and Format operations, as well as an Exit to conclude the content selection mode on that particular section. Each of these actions was previously explained, and that description is equally applicable here.

In some example embodiments, upon release of the dragging touch point to complete the selection process, the displayed content may effectively snap back to the beginning of the selected content (page 21 in this example). In other embodiments, the final page of selected content (page 23 in this example) may remain displayed. In other embodiments, an icon of each selected page may be displayed to the user, thereby allowing the user to jump to any selected page with a screen tap or other appropriate gesture.

As can be further seen with reference to FIG. 3e, the user may navigate back and forth while the content remains selected, in this example embodiment, which may provide a reading guide for the user. In one such embodiment, for instance, a teacher may assign a portion of a given digital text book. The teach or the teacher's student can thus select that assigned section as described herein so that he/she knows when to stop reading. To this end, and in accordance with an embodiment of the present invention, further note with respect to FIG. 3e that upon release of the dragging touch point, not only is the target content selected, but a 'Selection Page Count' UI feature (e.g., '(1 of 3)', '(2 of 3)', '(3 of 3)') is also displayed to the user so as to inform the user of the page numbers assigned to the multi-page content selection as well as how much more of the selected content remains from each given page. Once the student has finished the reading assignment, the content selection mode can be exited. Such a content selection and page numbering scheme may be useful in a number of other scenarios, as will be appreciated in light of this disclosure.

FIGS. 4a-d collectively illustrate an example multi-page content selection mode that can be applied to a touch sensitive display of an electronic device, in accordance with another embodiment of the present invention. The previous discussion with respect to type of content being selected, the manner in which one or more touch points are provided, highlighting schemes, optional pop-up menus to facilitate user post-selection actions, and other such commonalities, is equally applicable here as will be apparent. In this example case, the content is organized in a dual-column format and the targeted content selection spans across three columns of content. However, as will be appreciated in light of this disclosure, the targeted content selection may span any number of intervening section breaks, chapters, columns, or pages.

Figure 4A:
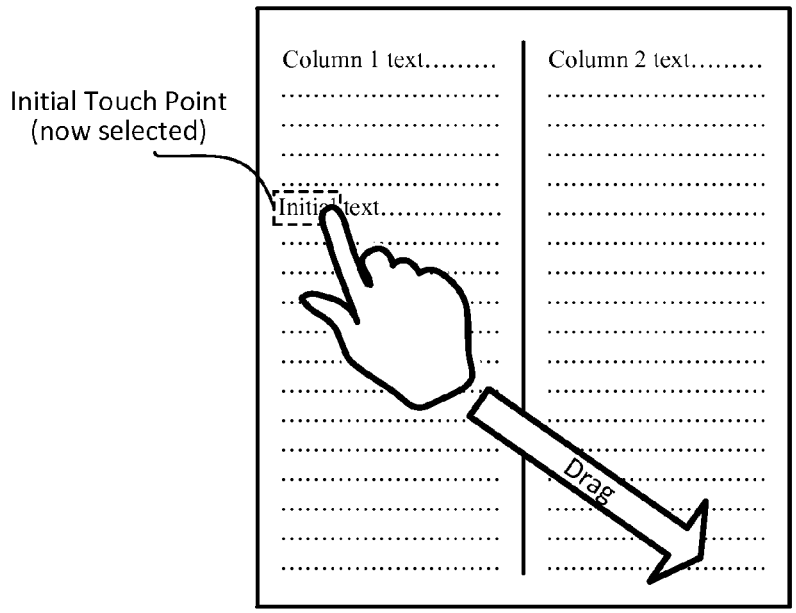
FIGS. 4a-d illustrate an example content selection mode of an electronic touch screen device, in accordance with another embodiment of the present invention.
Figure 4B:
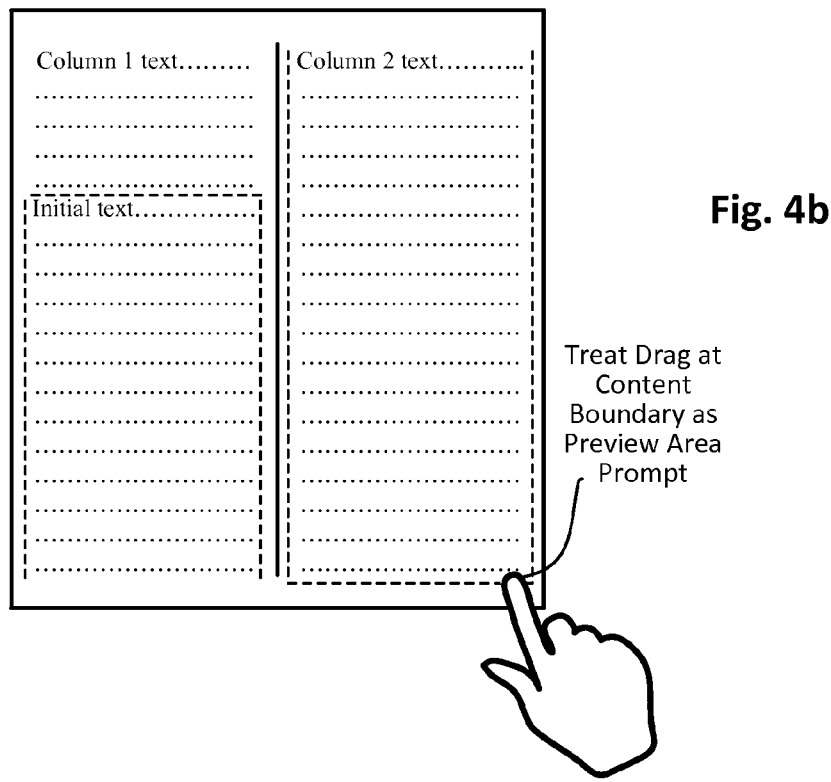

In FIG. 4a, the user has provided the initial touch point and has commenced the dragging gesture, wherein the initial target piece of content is the word 'Initial' in Column 1 of the content displayed. In one embodiment, the target piece of content may be highlighted or otherwise selected, for example, after a brief delay (e.g., 1 to 4 seconds) from application of the initial touch point. Alternatively, it may be selected immediately, as previously explained. In FIG. 4b, the user has further dragged the touch point and the corresponding target piece of content is now selected, as indicated with a dashed border in this example case. The selected content in this example spans the remaining section of Column 1 as well as the entirety of Column 2. In addition, note that the dragging touch point has reached the content boundary area, which is the bottom right corner of the touch screen display in this particular example embodiment.

At this point, the content selection mode is programmed or otherwise configured to convert or otherwise treat the dragging gesture as a preview prompt gesture so as to preview the next column of content (column 3 in this example) so that selection can continue, in accordance with an embodiment of the present invention. The next column of content from the next page begins slowly scrolling upward from the bottom of the second column display area so that the user has time to evaluate the content for the desired end location, or otherwise to move off the boundary area to allow the user more time to evaluate the column of content for the desired end location.

Figure 4C:
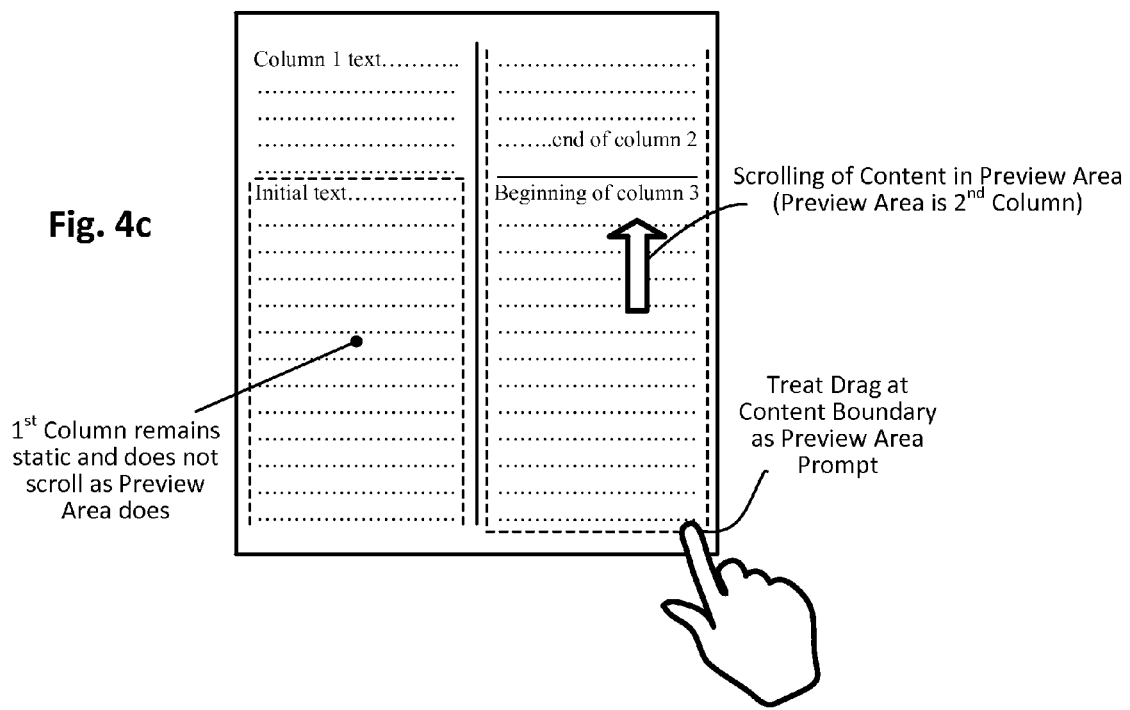

FIG. 4c shows an example embodiment of the preview function that has begun scrolling the text of column 2 upward so as to allow for previewing of content from column 3. In the example shown in FIG. 4c, the first column remains stationary and constantly displays to the user the beginning of the selected content. In such an example, only the second column display area becomes a preview area through which subsequent content scrolls and displaces the original second column content. FIG. 4c also shows the continued holding of the dragging touch point at the content boundary area, thereby continuing the preview function, so as to scrollingly advance further through the content. In one particular example, as each subsequent column is scrolled upward in turn, the speed of the scrolling may accelerate as previously explained.

Figure 4D:
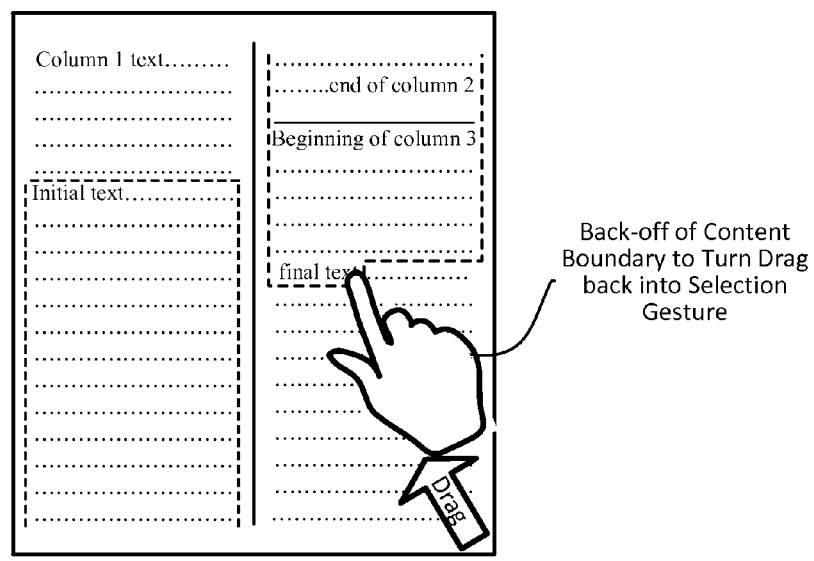

FIG. 4d of this example embodiment shows the user backing off the content boundary area and stopping the dragging touch point at the desired end location, where the target piece of content is the word 'text' near the middle of the preview column. The selection and outlining shown in FIG. 4d may be provided in real-time and in unison with the dragging touch point, or upon release of the dragging touch point. In this example embodiment, the target selection between (and including) the initial touch point on column 1 and the dragging end location on column 3 is highlighted or otherwise selected, as collectively shown in FIGS. 4a-d. As can be further seen in the example scenarios of FIGS. 4a-d, the initial and dragging touch point is provided by one of the user's fingers.

In one example embodiment, after the user has reached the final target content on column 3, the display may provide for the user the first column of content, along with the preview area showing the final column of content. Then, upon release of the dragging touch point to complete the selection process, the displayed content may effectively snap back to the beginning of the selected content (showing columns 1 and 2 in this example). In other embodiments, the final page of selected content (column 3 and possibly column 4 in this example) may remain displayed. In other embodiments, an icon of each selected page may be displayed to the user, thereby allowing the user to jump to any selected page with a screen tap or other appropriate gesture In some embodiments, a selection numbering feature may also be provisioned as previously discussed with reference to FIG. 3e. For instance, in one such case, rather than a Selection Page Count UI feature, a Selection Column Count' UI feature could be provided to the user (e.g., '(column 1 of 3)', '(column 2 of 3)', '(column 3 of 3)') so that the user may keep track of the column numbers assigned to the multi-column, multi-page content selection.

Methodology

Figure 5:
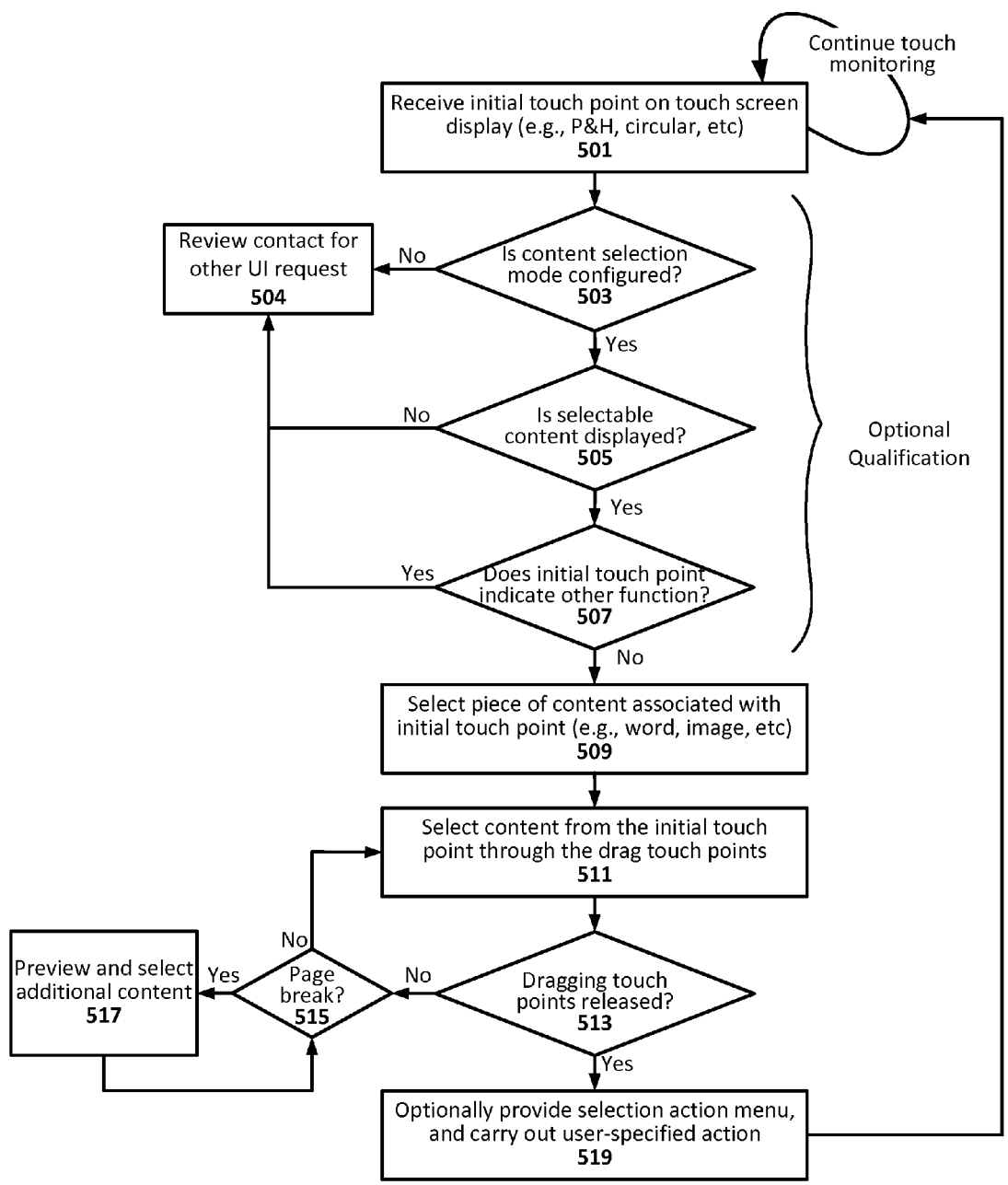
FIG. 5 illustrates a method for providing a content selection mode in an electronic touch screen device, in accordance with an embodiment of the present invention.

FIG. 5 illustrates a method for providing a content selection mode in an electronic touch sensitive screen device, in accordance with an embodiment of the present invention. This example methodology may be implemented, for instance, by the UI module of the example touch screen device shown in FIG. 2a, or the example touch screen device shown in FIG. 2b (e.g., with the UI provisioned to the client by the server). To this end, the UI can be implemented in software, hardware, firmware, or any combination thereof, as will be appreciated in light of this disclosure.

As can be seen, the method generally includes sensing a user's input by a touch screen display. As soon as the user begins to swipe, drag or otherwise move a contact point, the UI code (and/or hardware) can assume a drag/move gesture has been engaged and track the path of the contact point with respect to any fixed point within the touch screen until the user stops engaging the touch screen surface. The release point can also be captured by the UI as it may be used to commit the action started when the user pressed on the touch sensitive screen. In a similar fashion, if the user releases hold without moving the contact point, a tap or press or press-and-hold command may be assumed depending on the amount of time the user was continually pressing on the touch sensitive screen. These main detections can be used in various ways to implement UI functionality, including a content selection mode as variously described herein, as will be appreciated in light of this disclosure.

In this example case, the method includes receiving 501 an initial touch point at the touch screen interface. In general, the touch monitoring is effectively continuous. As previously explained, the initial touch point may be provided in any number of ways, such as those discussed with reference to Table 1. The method may continue with some optional qualification processing, which may be helpful to distinguish one type of contact from another type. Thus, in this example, the method continues with determining 503 if the content selection mode is configured. As previously explained, the selection mode may be always enabled and configured from the factory in some embodiments, while other embodiments may be configured and/or enabled by the user. To this end, the determination at 503 ensures that the content selection mode is a possible option for the contact just received.

In any case, if the content selection mode is not enabled or otherwise available for whatever reason, then the method may continue with reviewing 504 the contact for some other UI request (e.g., select a file, send an email, etc). On the other hand, if the content selection mode is enabled and available, the method continues with determining 505 if selectable content is currently being displayed. If not, then it is not likely that the content selection mode is desired, so the method may again continue with reviewing 504 the contact for some other UI request. However, if selectable content is currently being displayed, then the method may continue with determining 507 if the initial touch point indicates some other function is desired. If so (e.g., based on specificity of contact), then the method may again continue with reviewing 504 the contact for some other UI request.

If the initial touch point doesn't indicate some other function is desired, then it may be assumed that the content selection mode is desired. As will be appreciated, other embodiments may not include the qualification processes at 503, 504, 505, and 507. In this example embodiment shown in FIG. 5, the post-qualification method continues with selecting 509 the piece of content associated with the initial touch point (e.g., word, image, etc). As previously explained, a centroiding process may be executed in real-time to assist in determining the initial piece of content to select, in accordance with some such example embodiments.

The method continues with selecting 511 content from the initial touch point through the drag touch points. In some embodiments, the selected content may be highlighted or otherwise selected in unison with movement of the drag touch points, while in other embodiments the selecting occurs only upon release of the drag touch points. In a more general sense, indicating the user selection can be applied at any point after the user selection becomes apparent. The method may further include optionally determining 513 if the drag touch points have been released, and if so, optionally providing 519 a selection action menu, so as to facilitate the user carrying out a particular action (e.g., copying, etc).

If on the other hand, the determination at 513 indicates that the drag touch points have not been released, then the method continues with determining 515 if a page break has been encountered. A page break generally includes a structural content boundary that necessitates an intervening action or navigational gesture(s) to cross that boundary for content selection purposes. If a page break has not been encountered, then the selecting 511 from the initial touch point through the drag touch points continues. If on the other hand, the determination at 515 indicates that a page break has been encountered, then the method of this example embodiment continues with previewing 517 the desired content in a preview area and selecting that content. The previewed content may include a previous or subsequent page, for instance. The preview area may include the entire screen, the entire application window, or only a portion of the screen or application window (such as the last column in a multi-column document), in some example embodiments. The section break determination at 515 is repeated and previewing 517 the next content section (and selecting that content) continues until that determination at 515 is negative. At that point, the selecting 511 from the initial touch point through the drag touch points continues.

The method may continue in the touch monitoring mode indefinitely or as otherwise desired, so that any contact provided by the user can be evaluated for use in the content selection mode if appropriate. As previously indicated, the content selection mode can be exited by, for example, the user pressing a release mode UI feature such as the home button or a touch screen feature.

Numerous variations and configurations will be apparent in light of this disclosure. For example, one example embodiment provides a device that includes a display for displaying content to a user, and a user interface including a content selection mode configured to cause selection of all content between a first piece of content on a first displayed page and a second piece of content on a second page, wherein the content selection mode is further configured to preview content of the second page in a preview area on the first displayed page during a multipage selection process. As will be appreciated in light of this disclosure, the 'second page' as used here is not necessarily equal to page two or even a neighboring page, but merely refers to some page other than the currently displayed page, and may be behind the current page or ahead of the current page, with respect to a given structure of the content. In a similar fashion, the 'first displayed page' as used here is not necessarily equal to page one; nor is it necessarily the page just before the 'second page' as used here. The user may engage the mode using, for example, a touch screen (via touch point and dragging gesture), or a cursor-control device such as a mouse or trackpad (via click-hold-and-drag gesture). In some cases, for example, the content selection mode is further configured to treat a touch screen display touch point or a drag-and-hold cursor that rests on a page break area as a preview prompt gesture that causes provisioning of the preview area. In some cases, displayed content is organized in a multi-column format, and the preview area includes one of the columns of content. In some cases, content from the second page scrolls into the preview area and displaces content from the first displayed page. In some cases, the content selection mode is further configured to provide a selection action user interface feature to be displayed to the user, the selection action user interface feature being executable on the selected content. In some cases, the content selection mode is further configured to activate in response to user contact via a touch screen of the display, the user contact including an initial touch point targeting the first piece of content and that transitions into a dragging touch point targeting the second piece of content, wherein parameters of at least one of the initial touch point and/or the dragging touch point is user-configurable. In some cases, the content selection mode is further configured to cause a selection page count to be displayed on each selected page of the content when multiple pages are selected, the selection page count corresponding to the number of pages included in the selected content and starting at page one. In some cases, the content selection mode is further configured to cause the first piece of displayed content to be highlighted after a brief delay from application of an initial touch point, or once multiple dragging touch points are applied, or once a dragging touch point or cursor begins to move. In one such case, for example, the initial touch point includes a press-and-hold gesture, a diagonal gesture, and/or a circular gesture. In some cases, the selected content remains selected until the content selection mode is affirmatively terminated. In some cases, the device is, for example, an eReader device or a tablet computer or a smartphone or a laptop or a desktop computer or a television. The example device shown in FIG. 1a can effectively represent any such example devices/systems, as will be appreciated in light of this disclosure.

Another example embodiment provides a mobile electronic device. The device includes a touch screen display for displaying content to a user, and a user interface including a content selection mode configured to cause selection of all content between a first piece of content on a first displayed page and a second piece of content on a second page, wherein the content selection mode is further configured to preview content of the second page in a preview area on the first displayed page during a multipage selection process, wherein content from the second page scrolls into the preview area and displaces content from the first displayed page. The content selection mode is further configured to activate in response to user contact via the touch screen display, the user contact including an initial touch point targeting the first piece of content and that transitions into a dragging touch point targeting the second piece of content. In some cases, the content selection mode is further configured to provide a selection action user interface feature to be displayed to the user, the selection action user interface feature being executable on the selected content. In some cases, parameter of at least one of the initial touch point and/or the dragging touch point is user-configurable. In some cases, the content selection mode is further configured to cause a selection section count to be displayed on the preview area when multiple content sections are selected, the selection section count corresponding to the number of sections included in the selected content and starting at section one. In some cases, the initial touch point includes a press-and-hold gesture, a diagonal gesture, and/or a circular gesture.

Another embodiment of the present invention provides a computer readable medium encoded with instructions that when executed by one or more processors, cause a content selection process to be carried out. The process includes previewing, during a multi-page content selection process, content of a second page in a preview area on a first displayed page. The process further includes selecting all content between a first piece of selected content on the first displayed page and a second piece of content on the second page. In some cases, content from the second page scrolls into the preview area and displaces content from the first displayed page. In some cases, the process is activated in response to user contact via a touch screen display, the user contact including an initial touch point targeting the first piece of content and that transitions into a dragging touch point targeting the second piece of content, wherein parameters of at least one of the initial touch point and/or the dragging touch point is user-configurable, and wherein selected content remains selected until affirmatively unselected. In some cases, the process is further configured to display a selection page count on each selected page of the content when multiple pages are selected, the selection page count corresponding to the number of pages included in the selected content and starting at page one. The process may be implemented in any computing system, such as those including a touch screen user interface and those that include a cursor-based user interface.

The foregoing description of the embodiments of the invention has been presented for the purposes of illustration and description. It is not intended to be exhaustive or to limit the invention to the precise form disclosed. Many modifications and variations are possible in light of this disclosure. For example, while the techniques are particularly suited to touch screen devices, they can also beneficially be used with systems having other input devices. For instance, rather than using a figure/stylus and touch screen, the user could use a mouse and non-touch display. In such cases, the user could us the mouse (or trackpad or other cursor-based input device) to position the cursor over the initial piece of content and then perform a click-hold-and-drag to commence with the selection process as commonly done. However, once the drag-and-hold cursor reaches the page break area (and dwells there), a preview area can be provisioned so as to allow for presentation and selection of content from other pages on that given start page, as variously described herein. The previously provided relevant description is equally applicable here. Any number of other suitable input mechanisms can be used. It is intended that the scope of the invention be limited not by this detailed description, but rather by the claims appended hereto.

What is claimed is:

1. A device, comprising:
 a display for displaying content to a user, the content being organized in a multi- column format having a plurality of pages with each page having at least a left column and a right column; and
 a user interface including a content selection mode configured to cause selection of all content between a first piece of content on a first displayed page and a second piece of content on a second page,
 wherein the content selection mode is further configured to preview selected content of the second page in a preview area within the right column on the first displayed page during a multipage selection process such that the left column of the first displayed page remains stationary while content from the second page scrolls upward from below into the right column preview area, displacing content from the right column of the first displayed page, and
 wherein the selected content remains selected until the content selection mode is affirmatively terminated.

2. The device of claim 1 wherein the content selection mode is further configured to treat a touch screen display touch point or a drag-and-hold cursor that rests on a page break area as a preview prompt gesture that causes provisioning of the preview area.

3. The device of claim 1 wherein the content selection mode is further configured to provide a selection action user interface feature to be displayed to the user, the selection action user interface feature being executable on the selected content.

4. The device of claim 1 wherein the content selection mode is further configured to activate in response to user contact via a touch screen of the display, the user contact including an initial touch point targeting the first piece of content and that transitions into a dragging touch point targeting the second piece of content, wherein parameters of at least one of the initial touch point and/or the dragging touch point is user-configurable.

5. The device of claim 1 wherein the content selection mode is further configured to cause a selection page count to be displayed on each selected page of the content when multiple pages are selected, the selection page count corresponding to the number of pages included in the selected content and starting at page one.

6. The device of claim 1 wherein the content selection mode is further configured to cause the first piece of displayed content to be highlighted after a brief delay from application of an initial touch point, or once multiple dragging touch points are applied, or once a dragging touch point or cursor begins to move.

7. The device of claim 6 wherein the initial touch point includes a press-and-hold gesture, a diagonal gesture, and/or a circular gesture.

8. The device of claim 1 wherein the device is an eReader device or a tablet computer or a smartphone or a laptop or a desktop computer or a television.

9. A mobile electronic device, comprising:
a touch screen display for displaying content to a user, the content being organized in a multi-column format having a plurality of pages with each page having at least a left column and a right column; and
a user interface including a content selection mode configured to cause selection of all content between a first piece of content on a first displayed page and a second piece of content on a second page,
wherein the content selection mode is further configured to preview selected content of the second page in a preview area within one of the columns on the first displayed page during a multipage selection process,
wherein content from the second page scrolls upward from below into the preview area, displacing content from the column of the first displayed page having the preview area, while other content of the first displayed page outside the preview area remains stationary, and
wherein the selected content remains selected until the content selection mode is affirmatively terminated;
wherein the content selection mode is further configured to activate in response to user contact via the touch screen display, the user contact including an initial touch point targeting the first piece of content and that transitions into a dragging touch point targeting the second piece of content.

10. The device of claim 9 wherein the content selection mode is further configured to provide a selection action user interface feature to be displayed to the user, the selection action user interface feature being executable on the selected content.

11. The device of claim 9 wherein parameter of at least one of the initial touch point and/or the dragging touch point is user-configurable.

12. The device of claim 9 wherein the content selection mode is further configured to cause a selection section count to be displayed on the preview area when multiple content sections are selected, the selection section count corresponding to the number of sections included in the selected content and starting at section one.

13. The device of claim 9 wherein the initial touch point includes a press-and-hold gesture, a diagonal gesture, and/or a circular gesture.

14. A non-transient computer readable medium encoded with instructions that when executed by one or more processors, cause a content selection process to be carried out, the process comprising:
during a multi-page content selection process with respect to content that is organized in a multi-column format having a plurality of pages with each page having at least a left column and a right column,
previewing selected content of a second page in a preview area within one of the columns on a first displayed page, wherein content from the second page scrolls upward from below into the preview area, displacing content from the first displayed page column having the preview area, while other content of the first displayed page outside the preview area remains stationary; and
selecting all content between a first piece of selected content on the first displayed page and a second piece of selected content on the second page,
wherein the selected content remains selected until the content selection mode is affirmatively terminated.

15. The computer readable medium of claim 14 wherein the process is activated in response to user contact via a touch screen display, the user contact including an initial touch point targeting the first piece of content and that transitions into a dragging touch point targeting the second piece of content, wherein parameters of at least one of the initial touch point and/or the dragging touch point is user-configurable.

16. The computer readable medium of claim 14 wherein the process is further configured to display a selection page count on each selected page of the content when multiple pages are selected, the selection page count corresponding to the number of pages included in the selected content and starting at page one.

* * * * *